United States Patent [19]

Asai et al.

[11] Patent Number: 4,701,959
[45] Date of Patent: Oct. 20, 1987

[54] FINGERPRINT INPUT DEVICE EQUIPPED WITH A CLEANER FOR FINGER-IMPRESSING SURFACE

[75] Inventors: Ko Asai; Koichiro Morita, both of Tokyo, Japan

[73] Assignee: NEC Corporation, Tokyo, Japan

[21] Appl. No.: 756,447

[22] Filed: Jul. 18, 1985

[30] Foreign Application Priority Data

Jul. 18, 1984 [JP] Japan ............................. 59-148888
Jul. 18, 1984 [JP] Japan ............................. 59-148892

[51] Int. Cl.$^4$ ............................ G06K 9/00; G06K 9/26
[52] U.S. Cl. ....................................... 382/1; 382/4; 382/5; 350/582; 350/584; 15/246; 15/97 R
[58] Field of Search .................. 382/4, 5, 1; 356/71; 350/582, 584, 583; 358/332, 345, 347

[56] References Cited

U.S. PATENT DOCUMENTS

| | | | |
|---|---|---|---|
| 2,745,131 | 5/1956 | Auwarter | 350/582 |
| 3,677,623 | 7/1972 | Hall | 356/71 |
| 4,074,217 | 2/1978 | Yanagawa | 350/582 |
| 4,202,120 | 5/1980 | Engel | 382/4 |
| 4,210,899 | 7/1980 | Swonger | 382/5 |
| 4,310,827 | 1/1982 | Asai | 382/5 |
| 4,568,178 | 2/1986 | Rios | 355/40 |
| 4,641,350 | 2/1987 | Bunn | 382/34 |

Primary Examiner—David K. Moore
Assistant Examiner—A. Anne Skinner
Attorney, Agent, or Firm—Schwartz, Jeffery, Schwaab, Mack, Blumenthal & Evans

[57] ABSTRACT

A fingerprint input device for reading images of a fingerprint from a surface of a finger includes a base plate, an optical scanner, a rotary member, a first cleaning member, a switch, a detector and a control member. The optical member scans the finger-impressing surface to read the fingerprint. The rotary member has a first portion and a second, window portion. The first cleaning member is provided at the bottom of the first portion of the rotary member for wiping the finger-impressing surface by rotation thereof. The switch means is operated when the fingerprint input device is to be utilized, and the detector is operative for detecting release of the finger from the finger-impressing surface. The controller is responsive to outputs of the switch and the detector for controlling rotation of the rotary member to both expose the finger-impressing surface and to clean and cover same.

9 Claims, 9 Drawing Figures

FINGERPRINT INPUT DEVICE EQUIPPED WITH A CLEANER FOR FINGER-IMPRESSING SURFACE

BACKGROUND OF THE INVENTION

The present invention relates to a fingerprint input device used in a fingerprint identification system which carries out identification of a fingerprint to thereby indentify personnel by means of his fingerprint.

As disclosed in the U.S. Pat. No. 4,310,827, the fingerprint input device produces a two-dimensional photoelectrically converted image of an impressed fingerprint in the form of the streaked pattern and supplies it to an identifying processor of the fingerprint identification system which also comprises filing means for storing a plurality of minutiae lists each of which represents the feature points of a registered fingerprint. The processor compares the image with the plurality of minutiae lists or one of the minutiae lists selected by the user, and judges whether the impressed fingerprint is identical to the registered one or not.

The Japanese Patent Disclosures Nos. 69300/1979 and 85600/1979 described a fingerprint input device capable of directly scanning the front end of the finger put on a surface of a glass plate or a prism to obtain the digital image of the streaked pattern of the fingerprint. print. This input device is advantageous in that it does not require a recording medium, such as a paper card, on which the finger with ink is impressed to transfer the ink. The streaked pattern of the fingerprint can be read out without the finger being made dirty.

However, the conventional fingerprint input device may misread the streaked pattern of the fingerprint, because the furface ofthe finger is covered its secretion such as sweat and grease and the secretion adheres to the surface of the glass plate or the prism every time the finger is impressed thereon. Further, the dirt on the finger-impressing surface makes the user uncomfortable.

SUMMARY OF THE INVENTION

Accordingly, an object of the present invention is to provide a fingerprint input device capable of cleaning a finger-impressed surface.

Another object of the present invention is to provide a fingerprint input device capable of detecting a streaked pattern of the fingerprint with high reliability.

Still another object of the present invention is to provide a fingerprint input device which does not give unpleasantness to the user.

The fingerprint input device according to the present invention comprises a base plate including a transparent portion having a finger-impressing surface on which the finger is to impressed, means for optically scanning said finger-impressing surface to read the fingerprint of saide finger, rotary means rotatably provided on the surface of said base plate, said rotary means being rotatable around an axis substantially perpendicular to said finger-impressing surface and having a first portion with a length more than the length of said finger-impressing surface and a second portion provided with a window enough to expose said finger-impressing surface; and a first cleaning member provided on the bottom surface of said first portion of said rotary means such that it wipes said finger-impressing surface by the rotation of said rotary means.

BRIEF DESCRIPTION OF THE DRAWINGS

The above-mentioned and other objects, features and advantages of the present invention will be better understood from the following description of the preferred embodiments of the present invention taken in conjunction with the accompanying drawings, wherein.

DESCRIPTION OF THE PREFERRED EMBODIMENT

Figure 1:
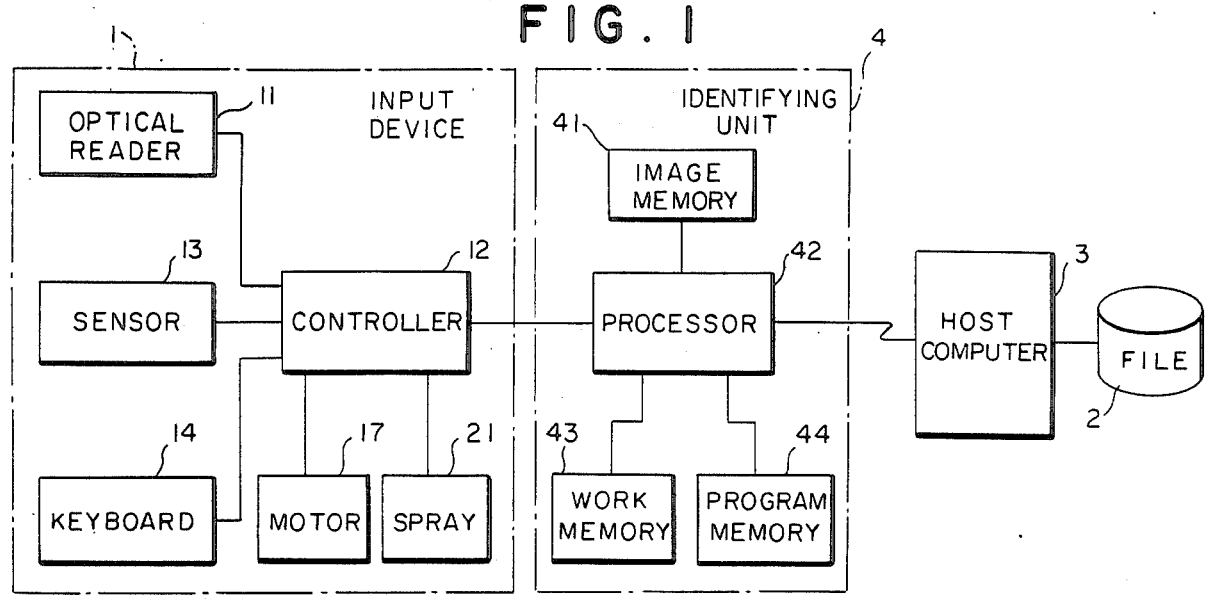
FIG. 1 is a block diagram of an identification system employing a fingerprint input device according to an embodiment of the present invention.

Referring to FIG. 1, the identification system according to an embodiment of the invention comprises a fingerprint input device 1 which produces the twodimensional digital image of a fingerprint in a streaked pattern from the front end of the finger, a file 2 such an optical disk memory which stores a plurality of minutiae lists each of which represents the feature points of a registered fingerpoint, a host computer 3 which manages the file 2, and an identification unit 4 which compares the two-dimensional digital image of the input fingerprint with the feature points of the registered fingerprint.

The input device 1 includes an optical reader 11 which optically scans the streaked pattern of the finger put on a surface of a transparent member such as a glass plate or a prism as disclosed in the Japanese Patent Disclosure Nos. 69300/1979 and 85600/1979. The scanning of the streaked pattern is began by the output signal of the sensor 13 which detects the presence of the finger on the transparent member. The streaked pattern is transformed into a two-dimensional digital image which is stored in the image memory 41 of the identifying unit 4 via a controller 12 and a processor 42.

A keyboard 14 is provided for entering the identification (ID) code allotted to each of the persons whose fingerprint is registered. The ID code is sent to the host computer 3 via the controller 12 and the processor 42, and then, converted into an address indicating the storing position of the file 2. The minutiae list read out from the file 2 is loaded to the work memory 43 of the identifying unit 4 through the host computer 3 and the processor 42.

The processor 42 checks the correspondence between the image data stored in the image memory 41 and the minutiae list stored in the work memory 43, which represents the features of the registered fingerprint, according to the program stored in a program memory 44. Such a system and the checking operation are disclosed in detail in the U.S. patent application Ser. No. 724,232 filed on April 18, 1985, entitled "IDENTIFICATION SYSTEM EMPLOYING VERIFICATION OF FINGERPRINTS", and assigned to the same assignee. Therefore, more detailed description is omitted.

Figure 2:
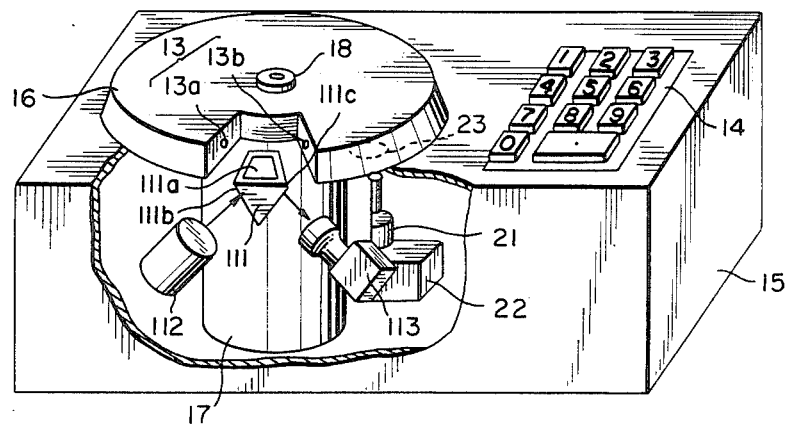
FIG. 2 is a perspective view of the fingerprint input device shown in FIG. 1.

Referring to FIG. 2, the fingerprint input device 1 according to an embodiment of the present invention comprises a prism 111 having a first surface 111a exposed from the upper surface of a housing 15, on which a finger is to be impressed, an illuminator 112 for supplying the light to the surface 111a of the prism 111 through a second surface 111b of the prism 111, and an image camera 113 for receiving the reflected light on the first surface 111a through a third surface 111c of the prism 111, all as components of the optical reader 11 shown in FIG. 1. The photographic image from the image camera 113 is converted to two-dimensional digital image in the manner known in the art.

Figure 3:
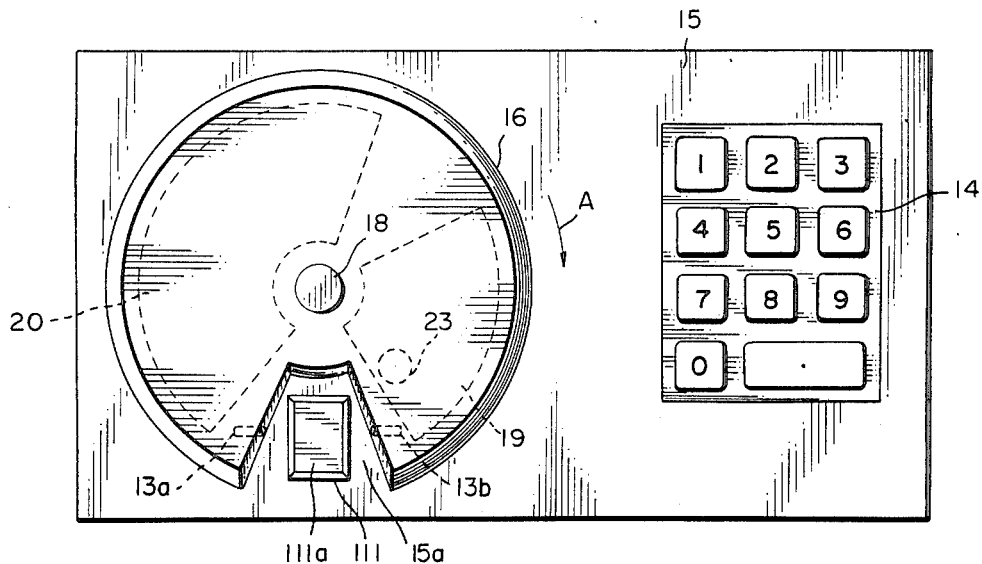
FIG. 3 is an upper plan view of the fingerprint input device shown in FIG. 1.

A turn table 16 made of aluminum or hard plastics is connected to the shaft 17a (FIGS. 4 or 5) of a rotary motor 17 by the fixing member 18 such that its bottom surface covers the upper surface of the housing 15. The turn table 16 has a radius more than the length of the finger-impressing surface 111a of the prism 111 and is provided with a sectorial window 16a of a size and an area enough to expose the finger-impressing surface 111a of the prism 111 when the turn table 16 is located in a predetermined rotational position. As shown in FIG. 3, the bottom surface of the turn table 16 is provided with the two-parted cleaning members 19 and 20 for cleaning the finger-impressing surface 111a of the prism 111.

A spray 21 is provided in the housing 15 so as to be located under the turn table 15. The spray 21 supplies cleaning liquid filled in a tank 22 to the cleaning member 19 through the hole 23 penetrated in the upper surface of the housing 15. As the cleaning liquid, a volatile liquid such as alcholic liquid or benzine is favorable. Further, the cleaning liquid may include the component for preventing the friction and static electricity. The spray 21 actuated by the controller 12.

The optical sensor 13 is provided to the side walls of the turn table 16 at the portion where the window 16a if formed. The sensor 13 includes a light emitting element 13a and a photo sensor 13b located to face with each other.

The keyboard 14 is also provided on the upper surface of the housing 15 to enter the ID code.

Figure 4:
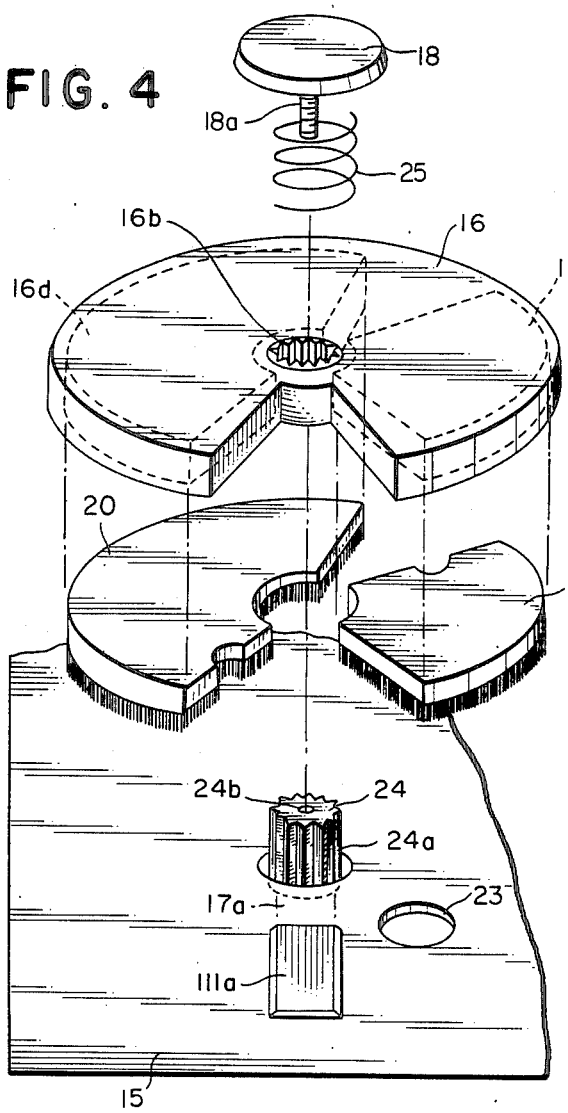
FIG. 4 is a perspective view showing the construction of a turn table of a first embodiment of the present invention.

Referring to FIG. 4, the motor shaft 17a has an engaging member 24 protruding the upper surface of the housing 15. The engaging member 24 has a plurality of teeth 24a around the outer circumference to engage the teeth 16b formed inner side of the center hole of the turn table 16. The engaging member 42 further has a screw hole 24b into which the screw 18a of the fixing member 18 is fixed. The turn table 16 is installed to the engaging member 24 and fixed thereto by the fixing member 18. A spring 25 is provided between the turn table 16 and the fixing member 18 to press the bottom surface of the turn table 16 against the upper surface of the housing 15. The turn table 16 can be removed from the engaging member 24 by loosening the fixing member 18.

The sectorial depressions 16c and 16d are formed in the bottom surface of the turn table 16. The cleaning members 19 and 20 are fixed in the depressions 16c and 16d, respectively. The napped cotton fibers 19a and 20a of suitable elasticity are adhered to the lower surface of the cleaning members 19 and 20. The cleaning members 19 and 20 can be took away from the turn table 16 in order to be exchanged to new ones when the fibers 19a and 20a have become dirty.

Figure 5:
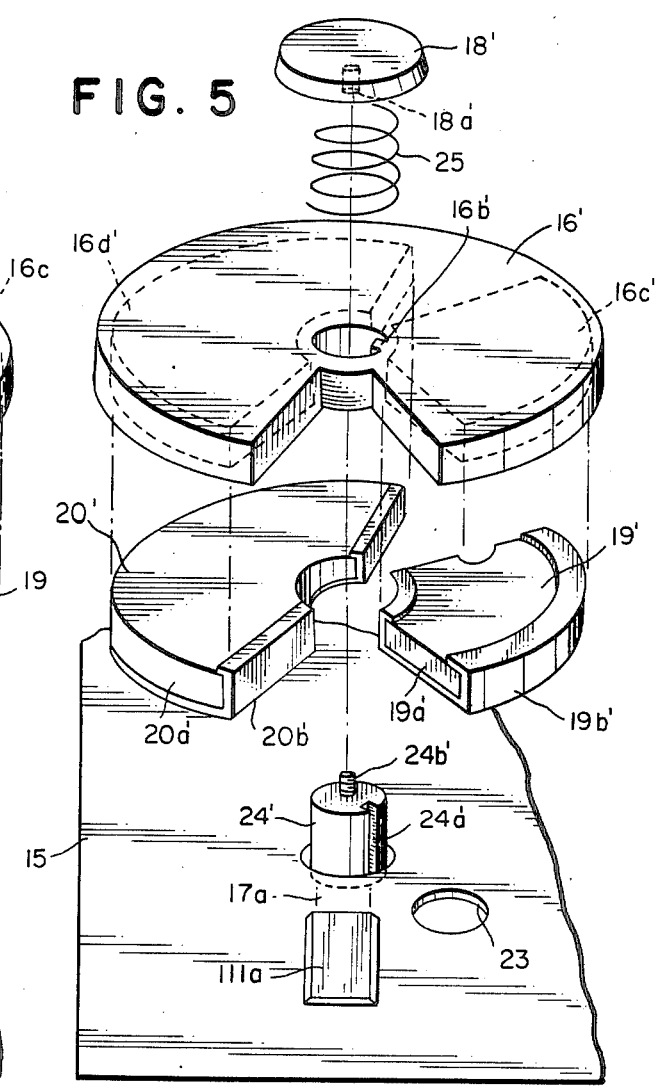
FIG. 5 is a perspective view showing the construction of a turn table of a second embodiment of the present invention.

Another example of the construction of the turn table 16' is shown in FIG. 5. In this embodiment, the motor shaft 17a has a engaging member 24' having a longitudinal groove 24a' formed on its outer circumferential surface. The center hole of the turn table 16' has a protuberance 16b' to engage the longitudinal groove 24a'. The engaging member 24' has a screw 24b' engageable with the screw hole 18a' of the fixing member 18'. The turn table 16' is installed to the engaging member 24' by guidance with the groove 24a' and fixed thereto by the fixing member 18'.

The sectorial depressions 16c' and 16d' are formed in the bottom surface of the turn table 16', similarly to the embodiment shown in FIG. 4. Cleaning members 19' and 20' include the sectorial pieces 19a' and 20a' and cleaning clothes 19b' and 20b' made by cotton covering the lower surfaces of the sectorial pieces 19a' and 20a', respectively. They are fixed in the depression 16c' and 16d'. The cleaning clothes 19b' and 20b' are exchangeable by taking away the cleaning member 19' and 20' from the turn table 16'.

The operation of the fingerprint input device 1 will be described hereinafter with further reference to FIGS. 6A to 6D.

Figure 6A:
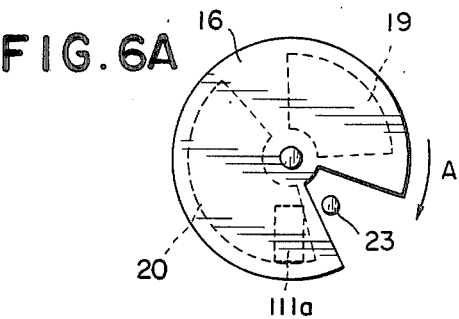
FIGS. 6A to 6D illustrate the cleaning operation of the turn table shown in FIGS. 4 or 5.

When the fingerprint input device is not employed, the turn table 16 is stopped at the position where the trailing portion of the cleaning member 20 is on the finger-impressing surface 111a of the prism 111, as shown in FIG. 6A. In this state, the finger-impressing surface is covered by the turn table 16 and accordingly, no dust adheres thereon and the surface 111a is protected from the shock to be given thereto.

Figure 6B:
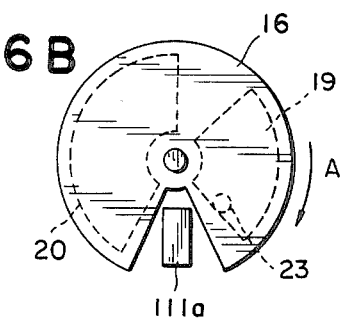

In employing the input device, a user operates the keyboard 14 to enter his ID code before he inputs his fingerprint to the input device 1. The controller 12 send the ID code to the identifying unit and enable the motor 17 to rotate by a certain angle in the direction A such that the window 16a of the turn table 16 is located on the finger-impressing surface 111a as shown in FIG. 6B. In this state, the surface 111a is exposed and the user put his finger on the surface 111a. The controller 12 detects the presence of the finger on the surface by means of the sensor 13 (FIG. 2), and then, enables the optical reader 11. The streaked pattern of the fingerprint is optically scanned by the optical reader 11 and its two-dimensional digital data is sent to the image memory 41.

Figure 6C:
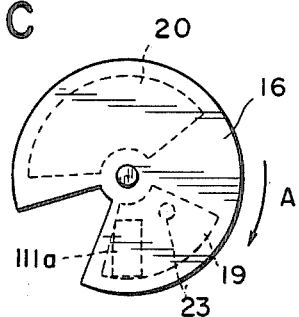

After the reading operation is completed, the controller 14 informs it to the user by means of an indicator (not shown) as well known in the art. When the user removes his finger from the surface 111a, the absence of the finger is detected by the sensor 13 and informed to the controller 12. Then, the controller 12 actuates the spray 21 and the motor 17 so that the cleaning liquid is supplied to the cleaning member 19 and the turn table 16 rotates in the direction A. The actuation of the spray 21 is carried out until the trailing portion of the cleaning member 19 passes through the hole 23 while the motor 16 is kept on rotating. Accordingly, the cleaning member 19 with the cleaning liquid wipes the fingerprint-impressed surface 111a with pressing thereon as shown in FIG. 6C, with the result that the contamination of the finger-impressing surface 111a by sweat and grease of the finger adhered thereto is got rid of therefrom by the cleaning member 19.

Figure 6D:
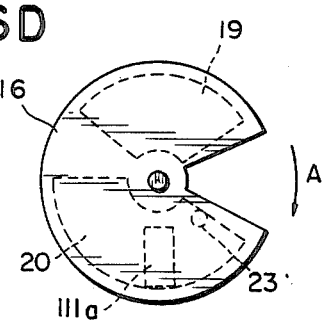

The turn table 16 is further rotated in the direction A so that the dry cleaning member 20 further wipes the surface 111a to absorb the cleaning liquid left thereon as shown in FIG. 6D. The rotation of the turn table 16 is stopped at the position shown in FIG. 6A and the input device is in a waiting state again.

In this embodiment, the presence of the finger is detected by the optical sensor 13. However, it may be detected by the ratio of a shadow image in the reflected light supplied to the image camera 113. That is, when the ratio of the shadow image exceed that the threshold level preset at 30 to 50%, the controller 12 decides that the finger is put on the surface 111a. For this purpose, the controller 12 may check only the one central scanning line of the image or the small area thereof.

Further, the turn table 16 may be located at the position shown in FIG. 6B in the waiting state of the input device 1 when used under the desirable condition such as in the clean room.

As described above, according to the present invention, the fingerprint-impressed surface of the input device can be automatically cleaned by the cleaner. Therefore, the streaked pattern of the fingerprint can be read with a high accuracy.

What is claimed is:

1. A fingerprint input device for reading an image of a fingerprint from a surface of a finger comprising:
    a base plate including a transparent portion having a finger-impressing surface with a length on which said finger is to be impressed;
    means for optically scanning said finger-impressing surface to read the fingerprint of said finger;
    rotary means rotatably provided on a surface of said base plate, said rotary means being rotatable around an axis substantially perpendicular to said finger-impressing surface and having a first portion with a length more than the length of said finger-impressing surface and a second portion provided with a window large enough to expose said finger-impressing surface;
    a first cleaning member provided on a bottom surface of said first portion of said rotary means such that it wipes said finger-impressing surface by a rotation of said rotary means;
    switch means operated when said fingerprint input device is to be utilized;
    detecting means for detecting release of said finger from said finger-impressing surface after said image of said fingerprint has been read from said finger; and
    control means for controlling said rotation of said rotary means in response to outputs of said switch means and said detecting means, said control means enabling said rotary means to rotate to a first position wherein said second portion of said rotary means is located on said finger-impressing surface to expose said finger-impressing surface when said switch means is operated, and to a second position wherein said first portion of said rotary means is located on said finger-impressing surface to cover said finger-impressing surface when said detecting means detects said release of said finger.

2. The fingerprint input device as claimed in claim 1, further comprising means for pressing the rotary means onto said finger-impressing surface.

3. The fingerprint input device as claimed in claim 1, further comprising means for supplying cleaning liquid to said first cleaning member.

4. The fingerprint input device as claimed in claim 3, further comprising a second cleaning member provided on the bottom surface of said first portion of said rotary means separately from said first cleaning means in the direction of the rotation of said rotary means, whereby said cleaning liquid left on said finger-impressing surface is removed therefrom by said second cleaning member.

5. The fingerprint input device as claimed in claim 1, wherein said rotary means can be detected away from said surface of said base plate to exchange said first cleaning member.

6. The fingerprint input device as claimed in claim 1, wherein said detecting means further comprises sensor means provided on said rotary means at said second portion where said window is located whereby the presence of said finger on said finger-impressing surface is detected by said sensor means.

7. The fingerprint input device as claimed in claim 1, wherein said switch means comprises a keyboard for inputting an identification code which is used for accessing a minutiae list stored in a memory means, said control means enabling said rotary means to rotate to said first position after said identification code has been input.

8. The fingerprint input device as claimed in claim 1, wherein said first cleaning member comprises napped cotton fibers or cotton cloth.

9. A fingerprint input device for reading an image of a fingerprint from a surface of a finger comprising:
    a base plate including a transparent portion having a finger-impressing surface with a length on which said finger is to be impressed;
    scanning means for optically scanning said finger-impressing surface to read the fingerprint of said finger;
    rotary means rotatably provided on a surface of said base plate, said rotary means being rotatable around an axis substantially perpendicular to said finger-impressing surface and having a first portion with a length more than the length of said finger-impressing surface and a second portion provided with a window large enough to expose said finger-impressing surface;
    a first and second cleaning members provided on a bottom surface of said first portion of said rotary means, said first and second cleaning member wipes being separated from each other in a direction of a rotation of said rotary means so that said first cleaning member wipes said finger-impressing surface, and then said second cleaning member wipes said finger-impressing surface;
    means for supplying cleaning liquid to said first cleaning member;
    code inputting means for inputting an identification code for accessing a minutiae list of one of registered fingerprints stored in a memory means, said code inputting means operated when said fingerprint input device is to be utilized;
    sensor means provided on said second portion of said rotary means whereby the presence or absence of said finger on said finger-impressing surface is detected by said sensor means when said second portion of said rotary means is located on said finger-impressing surface; and
    control means for controlling said scanning means and said rotary means in response to outputs of said code inputting means and said sensor means, said control means enabling said rotary means to rotate to a first position wherein said second portion of said rotary means is located on said finger-impressing surface to expose the same when the input of said indentification code is completed, and next enabling said scanning means to read said fingerprint when said sensor means detects the presence of said finger on said finger-impressing surface, and then enabling said rotary means to rotate to a second position wherein said first portion of said rotary means is located on said finger-impressing surface to cover the same when said sensor means detect the absence of said finger on said finger-impressing surface.

* * * * *